(12) United States Patent
Bernal et al.

(10) Patent No.: US 7,711,746 B2
(45) Date of Patent: May 4, 2010

(54) SYSTEM AND METHOD FOR DEPLOYING AN SQL PROCEDURE

(75) Inventors: Margaret Ann Bernal, San Jose, CA (US); Yao-Ching Stephen Chen, Saratoga, CA (US); Ding-Wei Chieh, Cupertino, CA (US); Curt Lee Cotner, Gilroy, CA (US); Baoqiu Cui, San Jose, CA (US); Tammie Dang, Morgan Hill, CA (US); Marion B. Farber, San Jose, CA (US); Georgia Carroll Fuller, San Jose, CA (US); Joe Cheng-yu Huang, San Jose, CA (US); Hui-An Lee, San Jose, CA (US); Claire Willey McFeely, San Jose, CA (US); Chunfeng Pei, San Jose, CA (US); James Willis Pickel, Gilroy, CA (US); Yumi Kimura Tsuji, San Jose, CA (US); Jay A. Yothers, Gilroy, CA (US); Margaret Alice Zagelow, Morgan Hill, CA (US); Liyan Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 11/311,810

(22) Filed: Dec. 17, 2005

(65) Prior Publication Data

US 2007/0143249 A1 Jun. 21, 2007

(51) Int. Cl.
*G06F 7/00* (2006.01)

(52) U.S. Cl. ...................................... 707/770; 717/136

(58) Field of Classification Search ....................... None
See application file for complete search history.

(56) References Cited

U.S. PATENT DOCUMENTS 4,558,413 A * 12/1985 Schmidt et al. ............. 707/203

(Continued)

FOREIGN PATENT DOCUMENTS

WO WO2004079568 A1 9/2004

OTHER PUBLICATIONS

Bruni P; Coomans D; Dentice Di Accadia F; Lippens H: "DB2 Stored Procedure Builder" DB2 UDB for OS/390 Version 6 Management Tools Package, May 2000, pp. 215-271.

*Primary Examiner*—Tim T. Vo
*Assistant Examiner*—Jau-Shya Meng
(74) *Attorney, Agent, or Firm*—Gates & Cooper LLP (57) ABSTRACT

An SQL procedure deployment system deploys a query procedure comprising a procedural logic component and a database request component from a source system to a target system. At generation of the query procedure, the system generates a query procedure source code, a symbol table, and an encapsulated optimization results to regenerate run-time instructions for query statements of the database request component and make the query statements function with a deployed procedural logic component. The system maintains an association between the procedural logic component and the database request component during deployment. The system copies an internal representation of the procedural logic component to the target system without regeneration. The system regenerates the database request component to recreate the query procedure on the target system and to maintain a consistent interface between the procedural logic component and database request component.

26 Claims, 8 Drawing Sheets

U.S. PATENT DOCUMENTS

| | | | |
|---|---|---|---|
| 5,987,455 A * | 11/1999 | Cochrane et al. | 707/4 |
| 6,105,035 A * | 8/2000 | Monge et al. | 707/4 |
| 2003/0055919 A1 | 3/2003 | Fong et al. | |
| 2003/0182652 A1 | 9/2003 | Custodio | |
| 2005/0209988 A1 * | 9/2005 | Cunningham et al. | 707/1 |
| 2005/0223018 A1 * | 10/2005 | Forin et al. | 707/100 |
| 2006/0053142 A1 * | 3/2006 | Sebbane | 707/102 |
| 2007/0050348 A1 * | 3/2007 | Aharoni et al. | 707/4 |
| 2007/0050380 A1 * | 3/2007 | Meijer et al. | 707/100 |

* cited by examiner

SYSTEM AND METHOD FOR DEPLOYING AN SQL PROCEDURE

FIELD OF THE INVENTION

This invention relates in general to database management systems performed by computers, and in particular, to transferring SQL procedures comprising SQL statements from a source database management system to a target database management system.

BACKGROUND OF THE INVENTION

The use of a database management system (DBMS) is well known in the art. Databases of the database management system are organized into tables that are comprised of rows and columns of data, wherein the rows are tuples and the columns are attributes. The tables are typically stored on direct access storage devices, such as magnetic or optical disk drives, for semi-permanent storage.

The use of a structured query language (SQL) interface to access data in the relational database management system is also well known in the art. The SQL interface has evolved into a standard language for database management system software and has been adopted as such by both the American National Standards Institute (ANSI) and the International Standards Organization (ISO). The SQL interface allows users to formulate relational operations on the tables either interactively, in batch files, or embedded in host languages such as C and COBOL.

An SQL procedure in a DBMS is created (or defined) by an SQL CREATE PROCEDURE statement. Different from an external stored procedure, an SQL procedure definition comprises a source code for the stored procedure. Users can change the procedure options, modify the procedure definition, and add a version or drop a version of the SQL procedure definition by executing, for example, an ALTER PROCEDURE statement. SQL procedures are stored in a database and maintained by the DBMS. In a manner similar to regular application programs, SQL procedures have a program life cycle comprising a design phase, an implementation phase, and a maintenance phase. SQL procedure developers follow a process of writing a code, testing the code, fixing bugs, etc., one or more times before the SQL procedures can be deployed to a production system for execution.

Typically, an internal implementation of an SQL procedure comprises a procedural logic component and a database request component. The procedural logic component comprises loop statements, conditional statements, and other control statements. The procedural logic component can be compiled into an internal representation of the procedural logic component for interpretation and execution during run time. Otherwise, the procedural logic component can be compiled into native code for direct execution. The database request component comprises SQL statements. The database request component is typically implemented via run-time instructions built by an SQL compiler and optimizer of the database requests by the DBMS.

Within many situations, users wish to ensure that performance of an SQL procedure deployed to a production system duplicates the behavior and performance of the SQL procedure on a testing system. Users cannot afford any minor behavior change in the procedural logic component after the SQL procedure is deployed. However, recreating the SQL procedure on the production system and generating a new internal representation of the SQL procedure engenders the possibility of behavior changes. A minor change in the procedural logic component can affect the main logic flow of the procedure, causing inaccurate results for SQL queries.

No conventional approach exists for ensuring consistent behavior and performance of an SQL procedure deployed from a source DBMS to a target DBMS. One related conventional technique has been implemented by DBMS users of external stored procedures. This conventional approach copies a procedure load module or DLL (dynamic load library) compiled on a testing system to a production system. However, this conventional technique is applicable only to external stored procedures, where the procedural logic component of the procedure is separate from the database request component and a load module or DLL is available to the user outside of the DBMS. An SQL procedure does not have an associated external load module; consequently, this conventional technique is not applicable.

What is therefore needed is a system, a computer program product, and an associated method for deploying an SQL procedure. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for deploying an SQL procedure comprising a procedural logic component and a database request component from a source system to a target system. At generation of the SQL procedure, the present system generates an SQL procedure source code, a symbol table, generates the symbol table and encapsulated optimization results to regenerate run-time instructions for query statements of the database request component and to make the query statements function with a deployed internal representation for the procedural logic component.

The present system maintains an association between the procedural logic component and the database request component during deployment. The present system copies an internal representation of the procedural logic component to the target system without regeneration. The present system regenerates the database request component to recreate the query procedure on the target system, and to maintain a consistent interface between the procedural logic component and database request component.

To copy an internal representation of the procedural logic component to the target system, the source system receives a request for deployment of the SQL procedure to the target system. The present system concatenates into a contiguous block an SQL procedure deployment set comprising the SQL procedure source code, the symbol table, the encapsulated optimization results, and an internal representation of the procedural logic component. The present system drives a bind package process for the SQL procedure deployment set comprising a deployment flag and regenerates the database request component on the target system.

To deploy the SQL procedure onto the target system, the target system receives the contiguous block comprising the SQL procedure deployment set. The target system updates one or more tables in a target catalogue of the target system to register the deployed SQL procedure. The target system saves the SQL procedure deployment set to disk and receives the database request component. For each of one or more SQL statements in the database request component, the present system binds the SQL statement; and uses the encapsulated optimization results to synchronize a plurality of run-time instructions with the internal representation of the procedural logic component.

The present system may be embodied in a utility program such as an SQL procedure deployment utility program. The present system also provides a method for the user to select on a source system an SQL procedure for deployment by, for example, specifying a package name for the selected SQL procedure, selecting a target system by, for example, selecting a location name for the target system, and then invoking the SQL procedure deployment utility to deploy the selected SQL procedure to the selected target system. In one embodiment, the present system provides a method for the user to specify a version of the selected SQL procedure by, for example, specifying a version ID. The present system further provides a method for a user to specify whether the selected SQL procedure adds a new version or replaces an existing version on the target system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
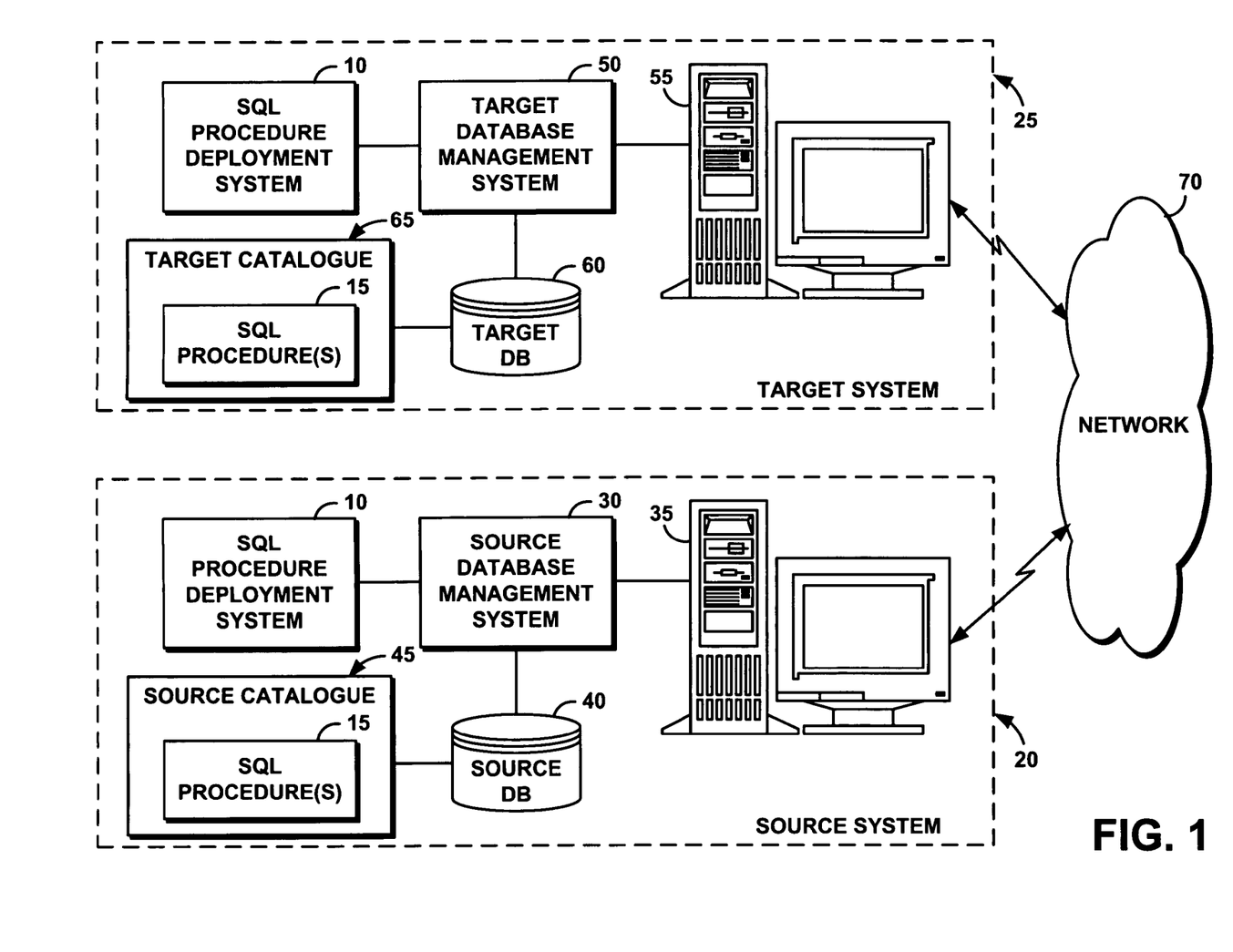
FIG. 1 is a schematic illustration of an exemplary operating environment in which an SQL procedure deployment system of the present invention can be used.

FIG. 1 portrays an exemplary overall environment in which a system, a computer program product, and an associated method (the SQL procedure deployment system 10 or the "system 10") for deploying a query procedure according to the present invention may be used. System 10 deploys one or more SQL procedures such as, for example, SQL procedures 15 from a source system 20 to a target system 25. System 10 on the source system 20 deploys the SQL procedures 15 to the target system 25. System 10 on the target system 25 binds the deployed SQL procedures 15 for use by the target system 25. While system 10 is described for illustration purpose only in relation to structured query language (SQL), it should be clear that the invention may also be applicable to other query languages.

The source system 20 comprises a source database management system (DBMS) 30 installed on a computer system such as, for example, a source server 35. The source system 20 further comprises a source database (DB) 40. The source DB 40 comprises a source catalogue 45 that in turn comprises the SQL procedures 15.

The target system 25 comprises a target database management system (DBMS) 50 installed on a computer system such as, for example, a target server 55. The target system 25 further comprises a target database (DB) 60. The target DB 60 comprises a target catalogue 65 that in turn comprises the SQL procedures 15.

System 10 deploys the SQL procedures 15 from the source system 20 to the target system 30 via a network 70. The target system 30 may be located remotely or locally with respect to the source system. Network 70 may be a remote network such as, for example, the Internet, or a local network such as, for example, a local area network. In one embodiment, the source system 20 and the target system 30 are the same.

System 10 comprises a software programming code or a computer program product that is typically embedded within, or installed on a computer such as the source server 35 or the target server 55. Alternatively, system 10 can be saved, at least in part, on a suitable storage medium. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 2:
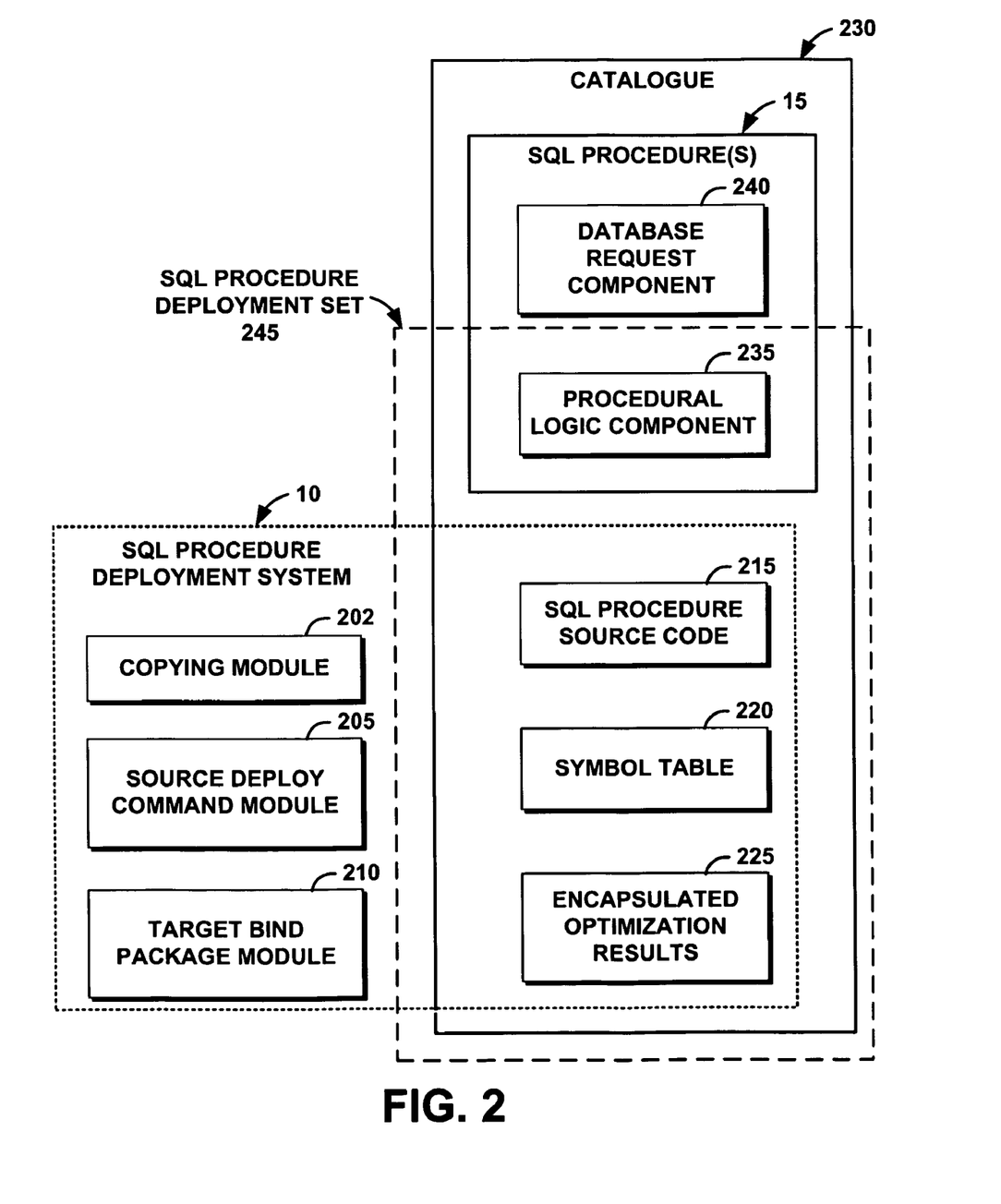
FIG. 2 is a schematic illustration of a high-level hierarchy of the SQL procedure deployment system of FIG. 1.

FIG. 2 illustrates a high-level hierarchy of system 10. System 10 generally comprises a copying module 202, a source deploy command module 205 operating on the source system 20 for deploying the SQL procedures 15 from the source system 20 to the target system 25. System 10 also comprises a target bind package module 210 operating on the target system 25 for driving a bind package process for the SQL procedures 15 deployed by the source deploy command module 205.

System 10 further comprises an SQL procedure source code 215, a symbol table 220, and encapsulated optimization results 225 stored on a catalogue 230 such as the source catalogue 40, is associated with one or more of the SQL procedures 15. Each of the SQL procedures 15 comprises a procedural logic component 235 and a database request component 240. A SQL procedure deployment set 245 comprises the SQL procedure source code 215, the symbol table 220, the encapsulated optimization results 225, and an internal representation of the procedural logic component 235.

When the SQL procedure 15 is created on the source system 20, system 10 saves for the created SQL procedure 15 the SQL procedure source code 215, the symbol table 220 and the internal representation of the procedural logic component, the encapsulated optimization results 225. The SQL procedure source code 215 is the definition of the SQL procedure 15, i.e., the CREATE PROCEDURE statement.

The symbol table 220 comprises the information of the SQL variables in the SQL procedure 15 and other internally generated data buffers. The symbol table 220 provides a linkage between the database request component 240 regenerated on the target system 25 and the intact internal representation of the procedural logic component 235, enabling use of optimization results generated by a compiler of the source system 25.

The encapsulated optimization results 225 encapsulates the optimization results generated by the compiler with respect to the procedural logic component 235 and an interface between the procedural logic component 235 and the database request component 240. With the information of the encapsulated optimization results 225, system 10 preserves the optimization results when the SQL procedure 15 is deployed to the target system 25, thus avoiding loss of performance by the deployed SQL procedures 15.

The SQL procedure source code 215, the symbol table 220, and the encapsulated optimization results 225 enable the target bind package module 210 to keep an internal representation of the procedural logic component 235 intact while regenerating the run-time instructions for the SQL statements in the database request component 240. The SQL procedure source code 215, the symbol table 220, and the encapsulated optimization results 225 are transferred to the target system 25 when the SQL procedure 15 is deployed. The SQL procedure source code 215, the symbol table 220, and the encapsulated optimization results 225 are used to regenerate the run-time instructions for the SQL statements represented by the database request component 240 and to make the SQL statements work with the unchanged internal representation for the procedural logic component 235.

The copying module 202 copies an internal representation of the procedural logic component to the target system 25 without regeneration. The source deploy command module 205 piggybacks a deployment command on a bind package command. A package is an object that comprises a set of SQL statements that have been statically bound and that is available for processing. For the SQL procedure 15, the database request component 240 is stored in a package. In one embodiment, the SQL procedures 15 comprise different versions. In this embodiment, different versions of the same SQL procedure 15 have different packages. The source deploy command module 205 comprises a bind command option DEPLOY for the purpose of deployment.

The source deploy command module 205 enables users to specify a location name for the target system 25. The source deploy command module 205 further enables a user to specify a package name for the SQL procedure(s) 15 to be deployed. In one embodiment, the source deploy command module 205 enables a user to specify a version ID for the SQL procedure(s) 15 to be deployed. In this embodiment, the source deploy command module 205 enables users to specify whether the deployment command adds a new version or replaces an existing version on the target system 25 after the SQL procedure 15 is deployed.

Figure 3:
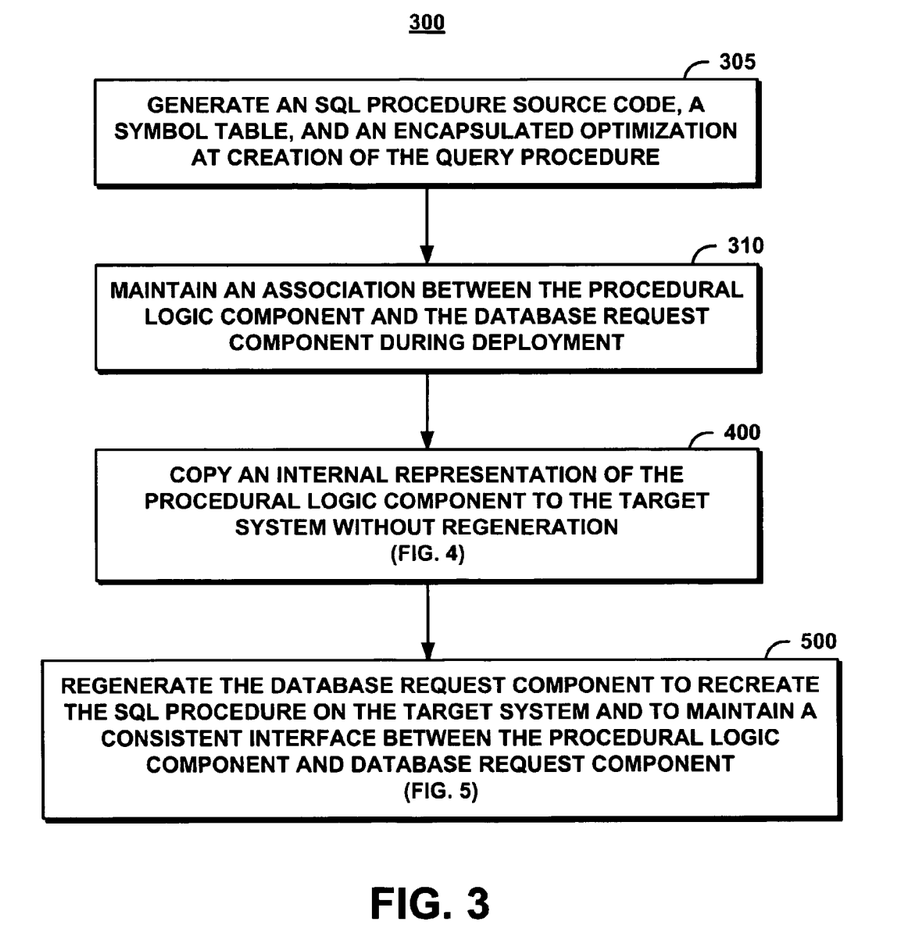
FIG. 3 is a process flow chart illustrating a method of operation of the SQL procedure deployment system of FIGS. 1 and 2 in deploying an SQL procedure from a source system to a target system.

FIG. 3 illustrates a method 300 of system 10 in deploying an SQL procedure 15 from the source system 20 to the target system 25. System 10 generates the SQL procedure source code 215, the symbol table 220, and the encapsulated optimization results 225 at creation of the SQL procedure(s) 15 (step 305). System 10 maintains an association between the procedural logic component 235 and the database request component 240 during deployment (step 310). The source deploy command module 205 copies the internal representation of the procedural logic component 235 to the target system 25 without regeneration (step 400, further described in FIG. 4). The target bind package module 210 regenerates the database request component 240 to recreate the SQL procedure(s) 15 on the target system 25 and to maintain a consistent interface between the procedural logic component 235 and the database request component 240 (step 500, further described in FIG. 5).

Figure 4A:
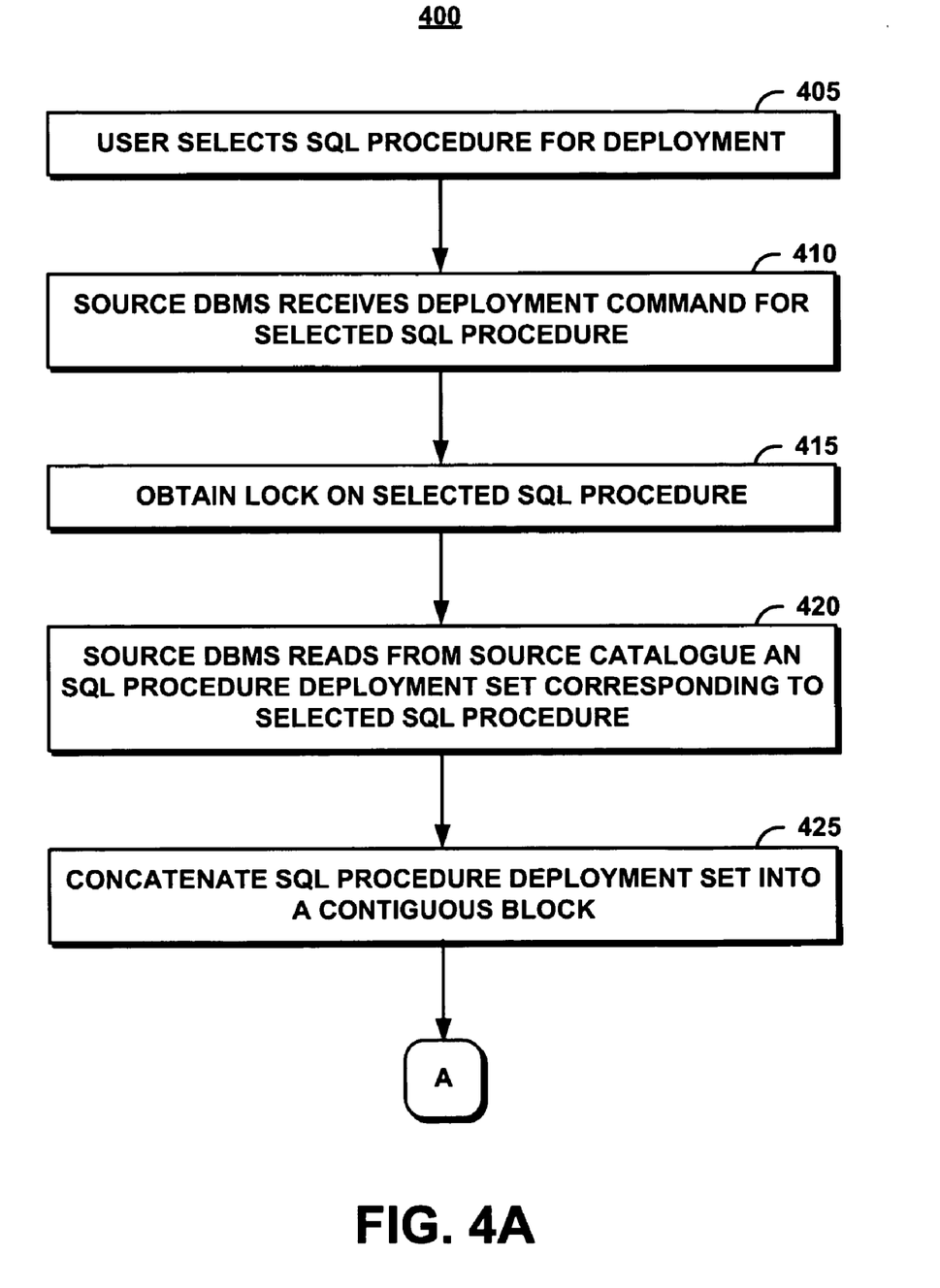
FIG. 4 is comprised of FIGS. 4A and 4B, and represents a process flow chart illustrating a method of operation of the SQL procedure deployment system of FIGS. 1 and 2 in transmitting an SQL procedure from a source system to a target system.
Figure 4B:
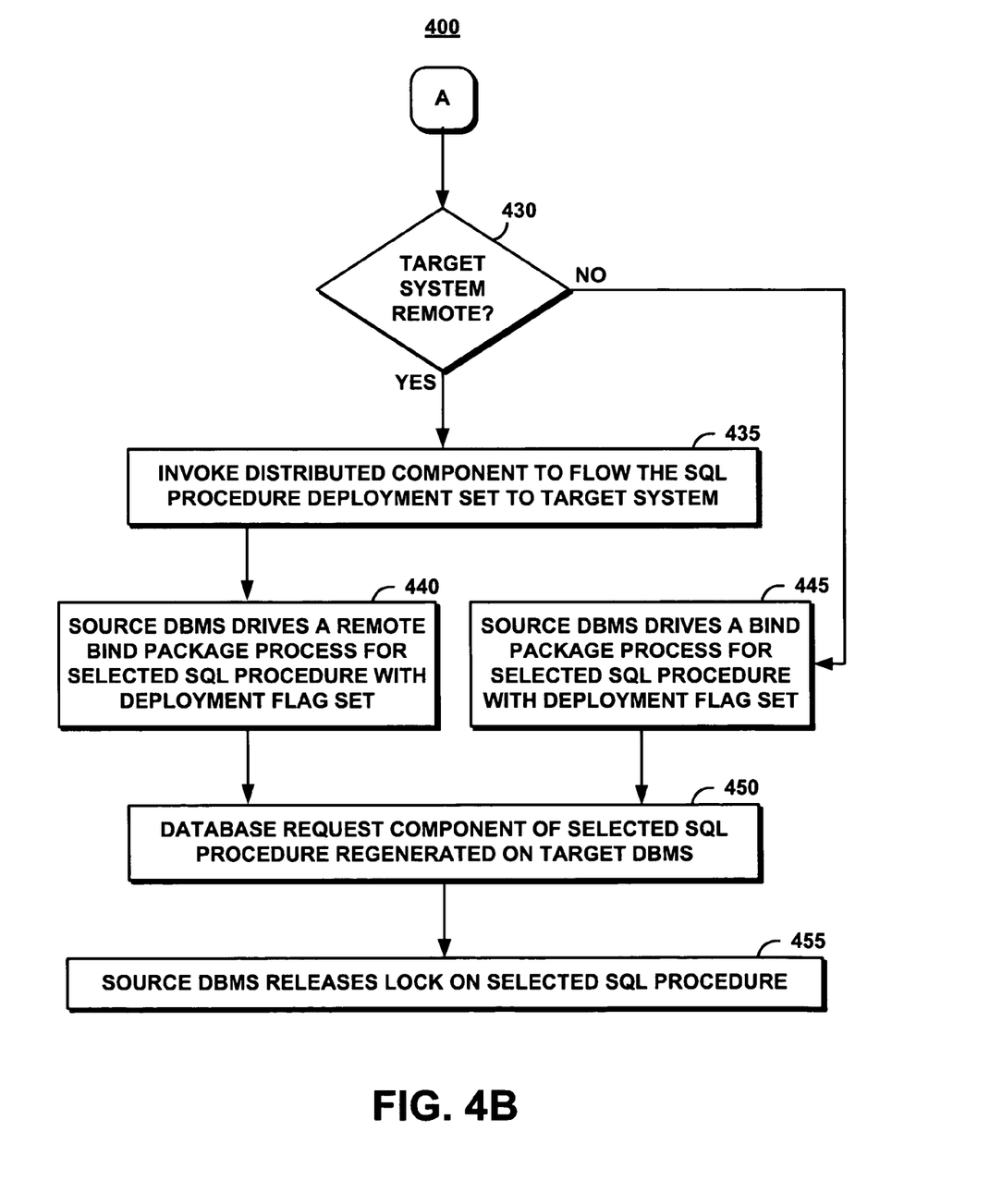

FIG. 4 (FIGS. 4A and 4B) illustrates a method 400 of system 10 in transmitting an SQL procedure 15 to a target system 25. A user selects an SQL procedure 15 for deployment (step 405). The source DBMS 30 receives a deployment command for the selected SQL procedure 15 (step 410). The source DBMS 30 obtains a lock on the selected SQL procedure 15 (step 415).

The source DBMS 30 reads (step 420) from the source catalogue 45 the SQL procedure deployment set 245 comprising the SQL procedure source code 215, the symbol table 220, the encapsulated optimization results 225, and the internal representation of the procedural logic component 235. The source DBMS 30 concatenates the SQL procedure deployment set 245 into a contiguous block (step 425).

System determines whether the target system 25 is remote (decision step 430). If yes, system 10 invokes a distributed component to flow the SQL procedure deployment set 245 to the target system 25 (step 435). The source DBMS 30 drives a remote bind package via the target bind package module 210 on the target system 25 with the deployment flag set to indicate that the bind package is for a deployment (step 440).

If at decision step 430 the target system 25 is not remote, the target system 25 is local. The source DBMS 30 drives a bind package via the target bind package module 210 on the target system 25 with the deployment flag set to indicate that the bind package is for a deployment (step 445).

The target bind package module 210 on the target system 25 regenerates the database request component 240 of the selected SQL procedure (step 450). The source DBMS 30 releases the lock on the selected SQL procedure (step 455).

Figure 5:
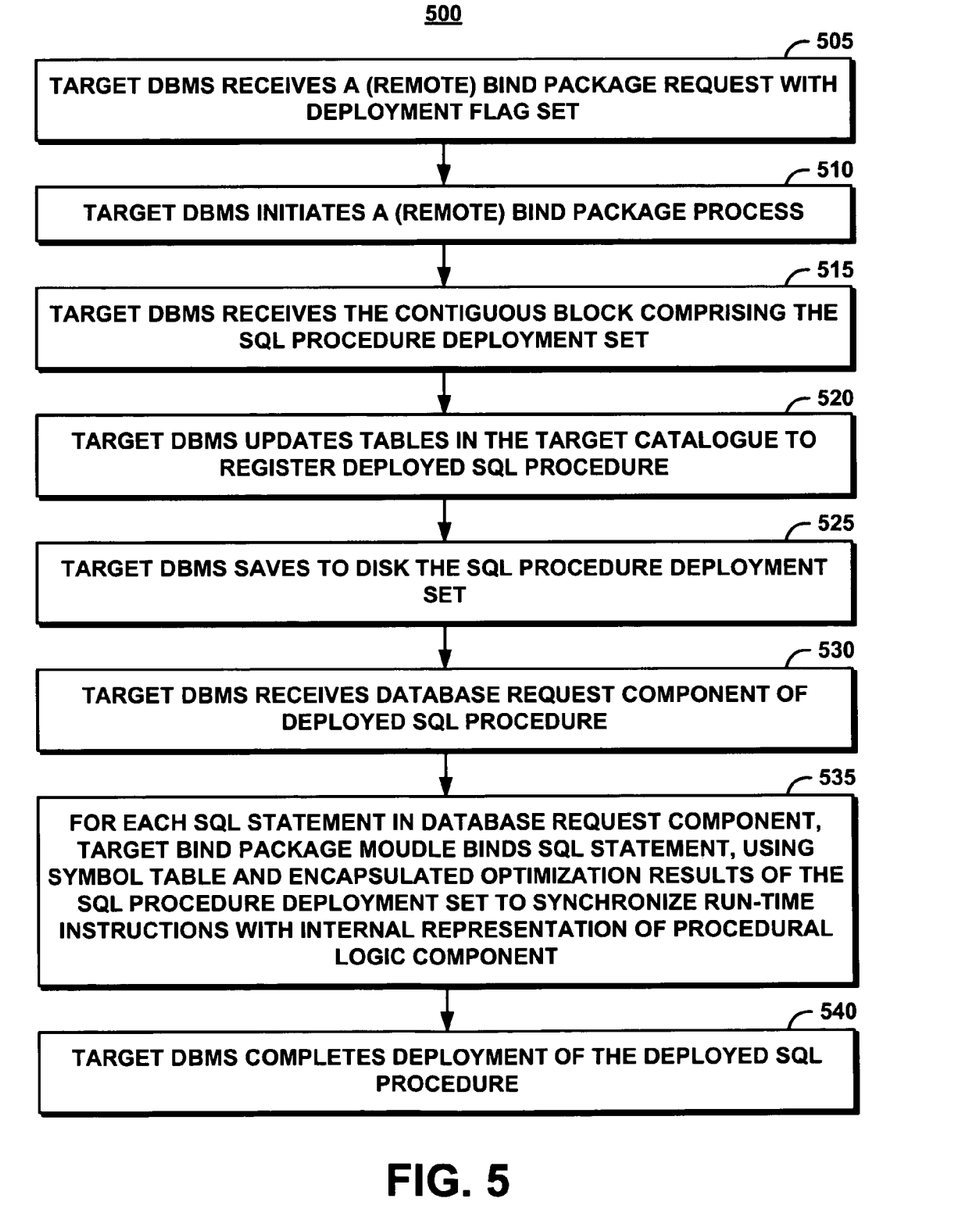
FIG. 5 is a process flow chart illustrating a method of operation of the SQL procedure deployment system of FIGS. 1 and 2 in receiving an SQL procedure at a target database management system.

FIG. 5 illustrates a method 500 of operation of system 10 in receiving an SQL procedure at the target system 25. The target DBMS 50 receives a bind package request with the deployment flag set for deployment of an SQL procedure 15 (step 505). If the source system 20 is remote from the target system 25, the target DBMS 50 receives a remote bind package request.

The target DBMS 50 initiates a bind package process by the target bind package module 210 on the target system 25 (step 510). If the source system 20 is remote from the target system 25, the target DBMS 50 initiates a remote bind package process. The target DBMS 50 receives the contiguous block comprising the SQL procedure deployment set (step 515). The target DBMS 50 updates tables in the target catalogue 65 to register the deployed SQL procedure 15 (step 520). The target DBMS 50 saves to disk the SQL procedure deployment set (step 525).

The target DBMS 50 receives the database request component 240 of the deployed SQL procedure 15 (step 530). For each SQL statement in the database request component 240, the target bind package module 210 binds the SQL statement (step 535). The target bind package module 210 uses the symbol table 220 and the encapsulated optimization results 225 of the deployed SQL procedure 15 to synchronize run-time instructions with the internal representation of the procedural logic component 235. The target DBMS completes deployment of the deployed SQL procedure 15 (step 540).

Figure 6A:
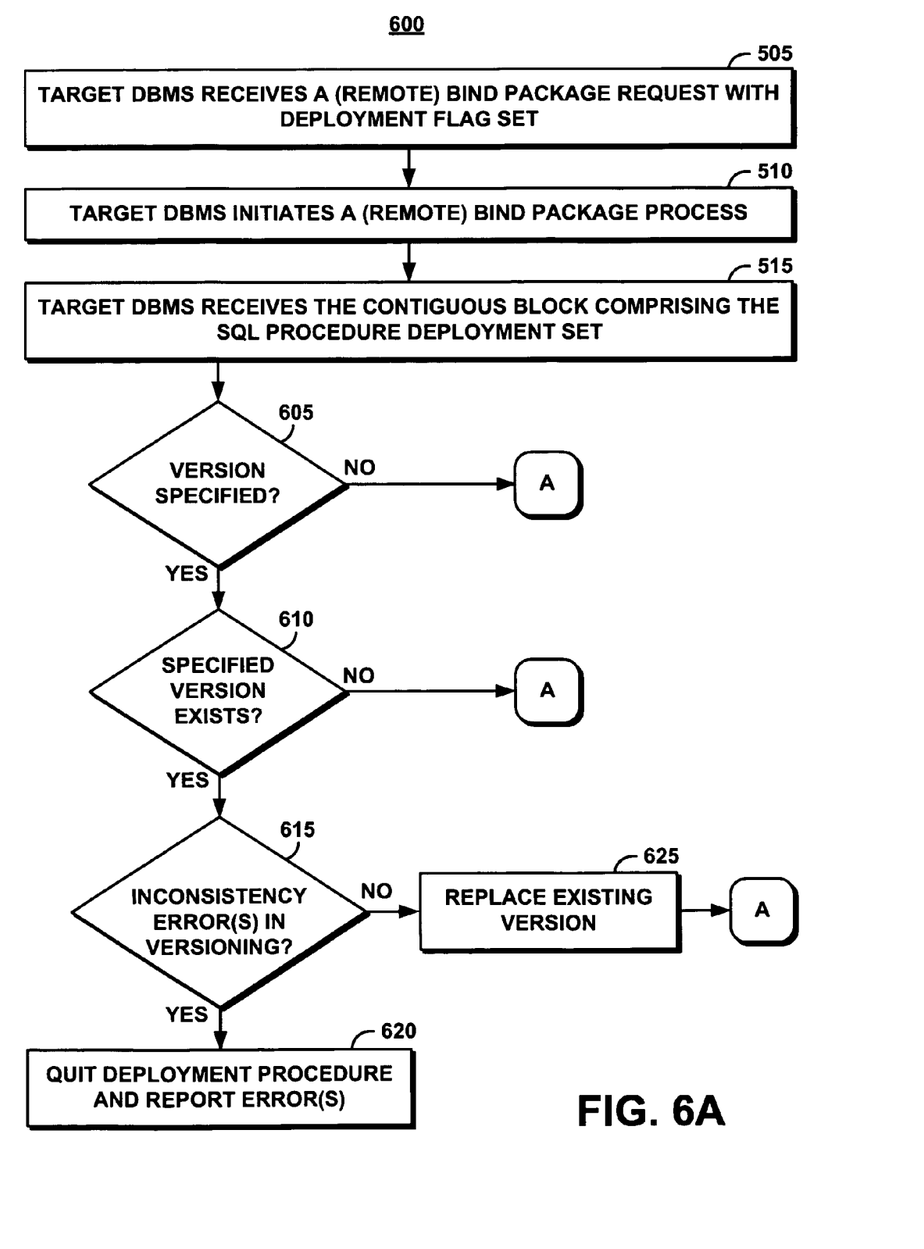
FIG. 6 is comprised of FIGS. 6A and 6B, and represents a process flow chart illustrating a method of operation of an embodiment of the SQL procedure deployment system of FIGS. 1 and 2 in receiving versions of an SQL procedure at a target database management system.
Figure 6B:
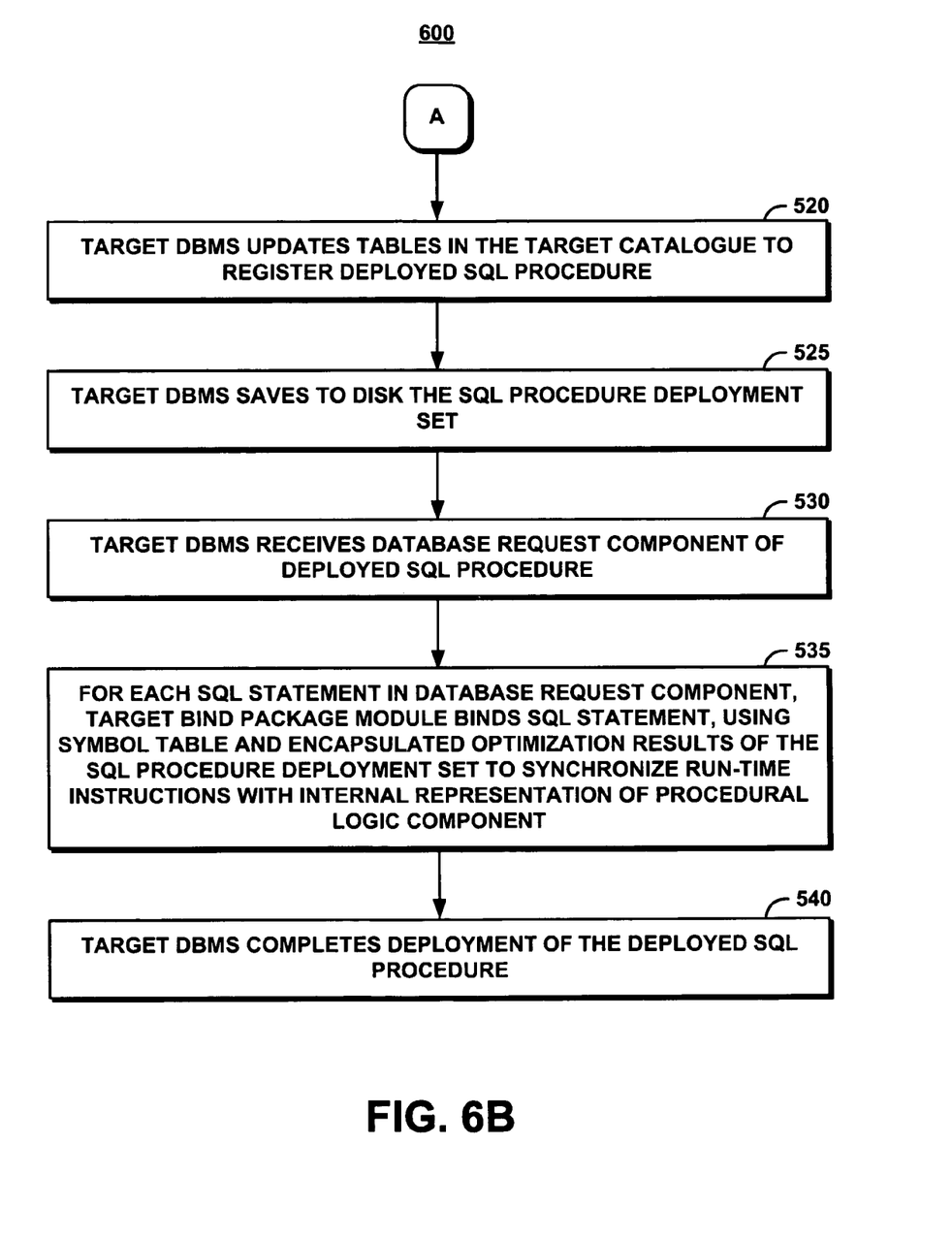

FIG. 6 (FIGS. 6A and 6B) illustrates a method 600 of an embodiment of system 10 in receiving versions of an SQL procedure at a target database management system. The target DBMS 50 performs steps 505 through 515 as previously described. The target bind package module 210 determines whether a version is specified for the deployed SQL package 15 (decision step 605). If not, the target DBMS 50 and the target bind package module 210 perform steps 520 through 540 as previously described.

If a version is specified (decision step 605), the target bind package module 210 determines whether the specified version exists (decision step 610). If not, the target DBMS 50 and the target bind package module 210 perform steps 520 through 540 as previously described. If the specified version exists, the target bind package module 210 checks for one or more inconsistency errors in the versioning of the deployed SQL procedure 15 (decision step 615). If consistency errors are found, the target bind package module 210 quits the deployment procedure and reports error(s) (step 620).

If no consistency errors are found, the target bind package module 210 replaces the existing version with the deployed SQL procedure 15 (step 625). The target DBMS 50 and the target bind package module 210 perform steps 520 through 540 as previously described.

The technique of system 10 in deploying the SQL procedures 15 does not require the target DBMS 50 to be identical to the source DBMS 30. System 10 checks the internal representation of the procedural logic component 235 to detect whether the procedural logic component 235 can be executed on the target DBMS 50. Provided the source DBMS 30 and the target DBMS 50 are compatible in the ability of processing the internal representation of the procedural logic component 235, differences between the source DBMS 30 and the target DBMS 50 are tolerated.

System 10 enables an SQL procedure 15 to be deployed from one system to another by using one command. This deployment occurs with no risk of behavior change in the procedural logic component 235 after the SQL procedure 15 is deployed. The procedural logic component 235 of the SQL procedure 15 is intact after deployment and works seamlessly with the database request component 240 generated on the target system 25.

It is to be understood that the specific embodiments of the invention that have been described are merely illustrative of certain applications of the principle of the present invention. Numerous modifications may be made to system and method for deploying a query procedure described herein without departing from the spirit and scope of the present invention.

What is claimed is:

1. A processor-implemented method for deploying a structured query language (SQL) procedure, the method comprising:

creating the SQL procedure comprising a procedure logic component that comprises one or more loop statements, conditional statement and other control statements and a database request component that comprises one or more SQL statements from a source system to a target system, wherein the procedural logic component and the database request component are deployed separately from the source system to the target system generating source code, a symbol table, and optimization results for the structured query language procedure, in order to regenerate run-time instructions for the SQL statements of the database request component, wherein the SQL statements of the database request component function with a deployed version of an internal representation of the procedural logic component;

maintaining an association between the procedural logic component and the database request component during deployment;

copying the deployed version of the internal representation of the procedural logic component to the target system without regeneration; and regenerating the database request component to recreate the structured query language procedure on the target system, and to maintain a consistent interface between the procedural logic component and the database request component.

2. The method of claim 1, wherein the symbol table provides a linkage between the database request component regenerated on the target system and the deployed version of the internal representation of the procedural logic component.

3. The method of claim 1, wherein the optimization results contain results generated by a compiler with respect to the procedural logic component and an interface of the procedural logic component with the database request component, preserving optimization results upon deployment of the structured query language procedure to the target system.

4. The method of claim 3, wherein the copying step comprises receiving a request at the source system for deployment of the structured query language procedure to the target system.

5. The method of claim 4, wherein the copying step further comprises invoking a distributed component to flow to the target system.

6. The method of claim 5, further comprising defining a query procedure deployment set as comprising the source code, the symbol table, the optimization results, and the deployed version of the internal representation of the procedural logic component; and wherein the copying step further comprises driving a bind package process for the query procedure deployment set.

7. The method of claim 6, wherein the structured query language procedure is recreated on the target system using the query procedure deployment set and the database request component.

8. The method of claim 7, wherein the structured query language procedure is recreated by, for each of the SQL statements in the database request component, binding the SQL statements; and using the optimization results to synchronize a plurality of run-time instructions with the deployed version of the internal representation of the procedural logic component.

9. The method of claim 3, further comprising checking for a version; and if a version exists, further checking for versioning errors.

10. The method of claim 9, further comprising replacing an existing version with the deployed structured query language procedure.

11. The method of claim 10, further comprising specifying a location name for the target system in a deploy command; and specifying a package name for structured query language procedure to be deployed.

12. The method of claim 1, wherein the target system is remotely located with respect to the source system.

13. A computer program product having program codes stored on a computer-readable device read and executed by a computer, results in the computer performing a method for deploying a structured query language (SQL) procedure, the method comprising:

creating the SQL procedure comprising a procedure logic component that comprises one or more loop statements, conditional statement and other control statements and a database request component that comprises one or more SQL statements from a source system to a target system, wherein the procedural logic component and the database request component are deployed separately from the source system to the target system, generating source code, a symbol table, and optimization results for the structured query language procedure, in order to regenerate run-time instructions for the SQL statements of the database request component, wherein the SQL statements of the database request component function with a deployed version of an internal representation of the procedural logic component;

maintaining an association between the procedural logic component and the database request component during deployment;

copying the deployed version of the internal representation of the procedural logic component to the target system without regeneration;

regenerating the database request component to recreate the structured query language procedure on the target system, and to maintain a consistent interface between the procedural logic component and the database request component.

14. The computer program product of claim 13, wherein the symbol table provides a linkage between the database request component regenerated on the target system and the deployed version of the internal representation of the procedural logic component.

15. The computer program product of claim 13, wherein the optimization results contain results generated by a compiler with respect to the procedural logic component and an interface of the procedural logic component with the database request component, preserving optimization results upon deployment of the structured query language procedure to the target system.

16. The computer program product of claim 15, wherein the copying step further comprises receiving a request at the source system for deployment of the structured query language procedure to the target system.

17. The computer program product of claim 16, wherein the copying step further comprises invoking a distributed component to flow to the target system.

18. The computer program product of claim 17, further comprising defining a query procedure deployment set as comprising the source code, the symbol table, the optimization results, and the deployed version of the internal representation of the procedural logic component; and wherein the copying step further comprises driving a bind package process for the query procedure deployment set.

19. The computer program product of claim 18, wherein the structured query language procedure is recreated on the target system using the query procedure deployment set and the database request component.

20. The computer program product of claim 19, wherein the structured query language procedure is recreated by, for each of the SQL statements in the database request component, binding the SQL statement; and using the optimization results to synchronize a plurality of run-time instructions with the deployed version of the internal representation of the procedural logic component.

21. The computer program product of claim 15, further comprising checking for a version for checking for versioning errors if a version exists.

22. The computer program product of claim 21, further comprising replacing an existing version with the deployed structured query language procedure.

23. The computer program product of claim 22, further comprising specifying a location name for the target system in a deploy command; and specifying a package name for structured query language procedures to be deployed.

24. The computer program product of claim 13, wherein the target system is remotely located with respect to the source system.

25. A processor-implemented system for deploying a structured query language (SQL) procedure the system comprising:

a source system, implemented by a processor, for creating the SQL procedure comprising a procedure logic component that comprises one or more loop statements, conditional statement and other control statements and a database request component that comprises one or more SQL statements from a source system to a target system, wherein the procedural logic component and the database request component are deployed separately from the source system to the target system, and, for generating source code, a symbol table, and optimization results for the structured query language procedure, in order to regenerate run-time instructions for the SQL statements of the database request component, wherein the SQL statements of the database request component function with a deployed version of an internal representation of the procedural logic component;

a catalogue, stored on the source system, for maintaining an association between the procedural logic component and the database request component during deployment;

a copying module, executed by the source system, for copying the deployed version of the internal representation of the procedural logic component to the target system without regeneration;

a target system, implemented by a processor, for executing a target bind package module for regenerating the database request component to recreate the structured query language procedure on the target system, and to maintain a consistent interface between the procedural logic component and the database request component.

26. The system of claim 25, wherein the symbol table provides a linkage between the database request component regenerated on the target system and the deployed version of the internal representation of the procedural logic component.

* * * * *